United States Patent [19]
Horvath

[11] 3,739,116
[45] June 12, 1973

[54] WATER SOFTENER REGENERATION CONTROL
[75] Inventor: John F. Horvath, Milwaukee, Wis.
[73] Assignee: Aqua-Chem, Inc., Milwaukee, Wis.
[22] Filed: Sept. 15, 1971
[21] Appl. No.: 180,747

[52] U.S. Cl. .............................................. 200/56 R
[51] Int. Cl. .......................................... G01d 13/26
[58] Field of Search ................... 200/38 CA, 56 R, 200/83 S, 83 SA; 210/85, 190

[56] References Cited
UNITED STATES PATENTS

| 3,540,305 | 11/1970 | Sprung ............................ 200/835 X |
| 3,490,591 | 1/1970 | Jones et al. ............................ 210/85 |
| 2,601,154 | 6/1952 | Krueger et al. ............ 200/38 CA X |
| 3,334,044 | 8/1967 | Satterlee ............................ 210/85 X |
| 2,467,433 | 4/1949 | King ................................... 210/190 |
| 3,348,005 | 10/1967 | Mowry et al. ...................... 200/83 S |
| 3,101,418 | 8/1963 | Gould .......................... 200/38 CA X |

Primary Examiner—J. R. Scott
Attorney—Fred Wiviott and Ralph G. Hohenfeldt

[57] ABSTRACT

Initiation of the regeneration cycle of a water softener is achieved on the basis of the volume of water processed by the softener. Flow volume is measured and when a preselected amount of flow has occurred, a control is actuated to initiate the regeneration cycle. The mechanism for translating the measured flow is reset to the prescribed starting point after the regeneration cycle has been initiated and is adjustable to provide control at any one of a number of different flow gallonages.

15 Claims, 3 Drawing Figures

PATENTED JUN 12 1973

3,739,116

Inventor
John F. Horvath
By Joseph A. Jennings
Attorney

WATER SOFTENER REGENERATION CONTROL

BACKGROUND OF INVENTION

This invention relates to water softeners and, more particularly, to controls for initiating the regeneration cycle of a water softener.

As is well known, the resin bed of a water softener must be periodically regenerated. In the past, straight timing arrangements have been utilized to initiate the regeneration cycle, i.e. after a preselected period of time the regeneration cycle is initiated. Also, the regeneration cycle has also been controlled by sensors which are exposed to the water processed by the softener and respond to the ion concentration of the water. These prior proposals have not been entirely satisfactory. For example, those relying on a straight timing type of operation initiate the regeneration cycle without any real assurance that it is taking place at the appropriate time, i.e. the regeneration may take place before the resin bed actually needs regeneration or, on the other hand, could be substantially late so far as the time when regeneration is necessary. As to the arrangements for sensing directly the water condition, these are dependent for their reliability on the condition of the sensor itself, i.e., the sensor must be free of contaminants to insure accurate monitoring of the water processed by the water softener and this is a condition difficult to maintain in the environment of a water softener.

This invention is concerned with this problem and has as one of its general objects to provide automatic initiation of the regeneration cycle, on a reliable basis over an extended period of time, and with a minimum of service attention.

For the achievement of this and other objects of this invention, it is proposed that an arrangement be provided wherein the volume of water processed by the water softener is measured. The flow volume is utilized as the parameter on which the initiation of the regeneration cycle is initiated. More specifically, the metering, or measuring, mechanism is connected through a translating mechanism to a control signal generator. The translating mechanism responds to the volume of flow measured by the metering arrangement and, when the prescribed volume of flow has been reached, activates the control mechanism to initiate the regeneration cycle.

Preferably, adjustment is provided to vary the volume of flow which is necessary to initiate the regeneration cycle and also provision is included for automatically resetting the arrangement to the desired starting point after the regeneration cycle has been initiated.

Other objects and advantages will be pointed out in, or be apparent from, the specification and claims, as will obvious modifications of the single embodiment shown in the drawings in which:

DESCRIPTION OF PREFERRED EMBODIMENT

The actual showing of a water softener construction has been eliminated from the drawings since the water softener per se can be of any well known structure and is not necessary to an understanding of the present invention. It will be readily apparent to those skilled in the art as to how the apparatus incorporating the present invention, and to be described, would be connected into the flow system of a water softener.

Figure 1:
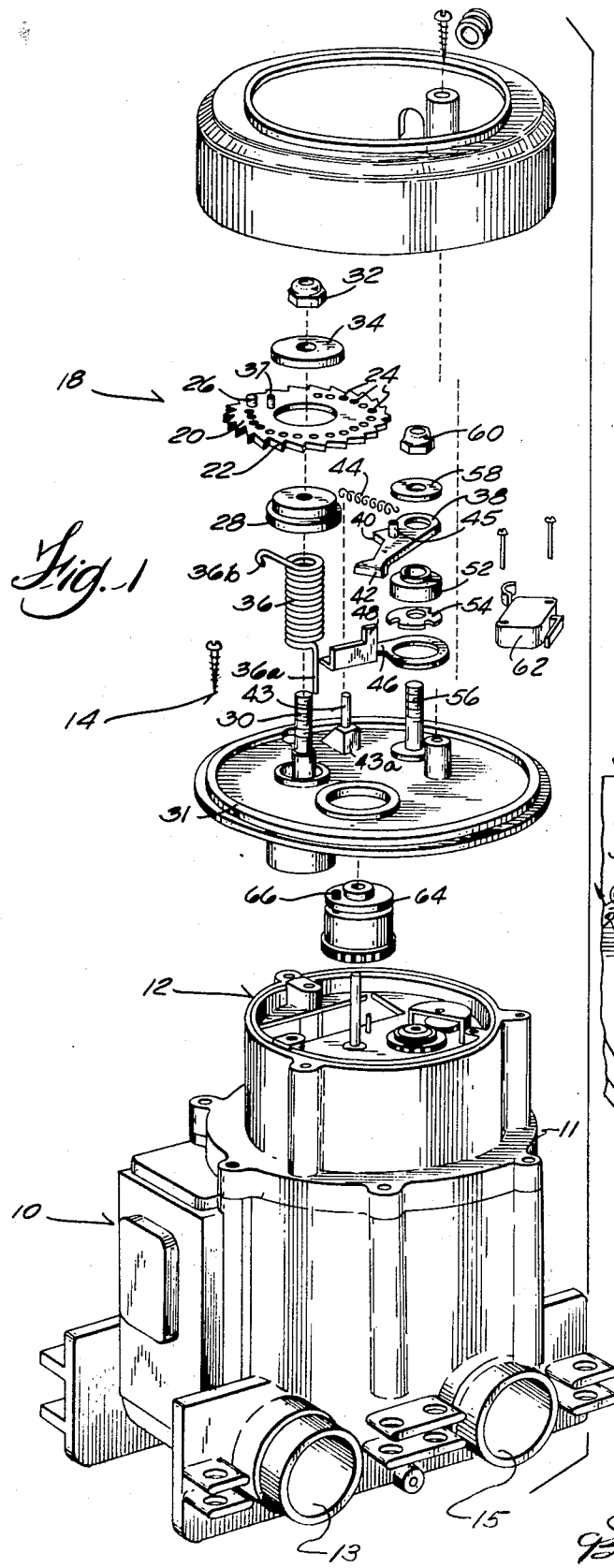
FIG. 1 is an exploded view of an arrangement embodying this invention.

With particular reference to FIG. 1, flow meter 10 is connected through a drive unit 12 to translating arrangement 14. Flow meter 10 can be of any suitable conventional construction, for example, can be of the well known nutating disc type used in water meters. Also, drive 12 can be of any conventional construction, for example that incorporating a magnetic coupling wherein the drive is powered by magnets arranged on opposite sides of imperforate wall 11 between the drive unit and the nutating disc chamber to insure a sealed arrangement of the meter housing. Ports 13 and 15 form the meter inlet and outlet for connection to the water softener. The meter can be positioned on either the untreated or soft water side of the water softener, preferably on the soft water side.

Translating arrangement 14 includes an electrical switch 16 which, through suitable electrical connections, can be connected to an arrangement (not shown) for initiating the regeneration cycle. Switch 16 is utilized to provide an electrical signal to activate the water softener valve to interrupt the supply of soft water to the household while at the same time connecting the water softener mineral tank to the brine tank for regeneration of the resin bed. Generally the regeneration cycle is carried on in the early hours of the morning when the demand for soft water in the household should be negligible. It is also common practice during this time to provide, in the water softener valve, for the furnishing of hard water to the household so that the supply of water is not entirely interrupted. The water softener valve can have any well known construction and hence has not been illustrated.

Figure 3:
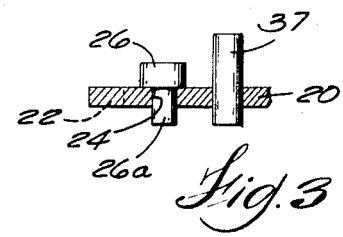
FIG. 3 is a section view taken along line 3—3 of FIG. 2.

The flow gallonage measured by meter 10 is recorded in arrangement 18 which includes gallonage disc 20 provided with teeth 22 which correspond to various gallonage figures. Also, disc 20 includes a plurality of holes 24 corresponding to teeth 22 and to the various gallonage figures. A removable peg 26 is provided and can be selectively inserted into anyone of the gallonage holes 24. The peg 26 has a projection 26a below disc 20 as well as above the disc as is illustrated in FIG. 3. Once the flow gallonage at which the regeneration cycle is to be initiated has been determined, peg 26 can be inserted into the hole 24 which corresponds to that flow gallonage. Holes 24 can be provided in increments of 100 gallons, for example as illustrated 20 such holes are provided and vary from 100 to 2,000 gallons.

Disc 20 fits on hub 28 and the disc and hub both fit over post 30. Nut 32 and washer 34 hold the disc and hub assembled on post 30. A coil spring 36 is also mounted on post 30 and has one end 36a anchored in base 31 with the other end 36b connected to a portion 37a of stop 37 which also projects beneath disc 20 (see FIG. 3). Spring 36 is the reset spring and is arranged to return disc 20 to its initial setting after the regeneration cycle has been initiated. This will be explained more completely hereinafter.

Pawl 38 is mounted adjacent disc 20. The pawl includes an intermediate projection 40 and a turned end 42. Coil spring 44 extends between post 43 on base 31 and post 45 on pawl 38. The coil spring is effective to bias pawl 38 in a clockwise direction so that turned end 42 is biased into engagement with selective ones of teeth 22 on the disc. An arm 46 is positioned beneath pawl 38 and includes a turned projection 48. Arm 46 is positioned over post 56 and pawl 38 is assembled onto hub 52 and spring washer 54 is positioned between hub 52 and the upper surface of arm 46. The assembly of arm 46, pawl 38, hub 52, and washer 54 is held together on post 56 by means of nut 60 and washer 58. In the final assembled arrangement, projection 48 on arm 46, engages the edge of intermediate projection 40 on pawl 38 (see FIG. 2).

Figure 2:
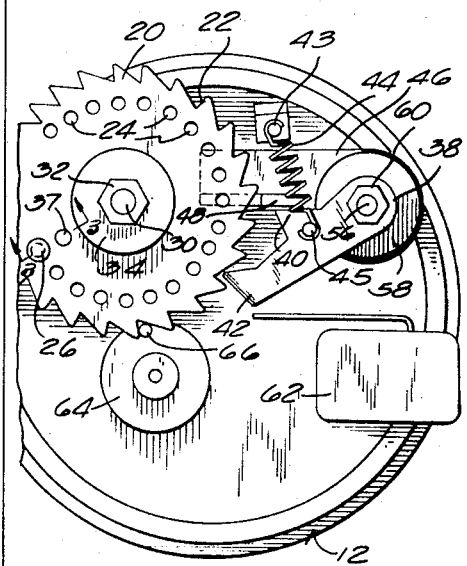
FIG. 2 is a top plan view of the translating mechanism and the control switch which utilizes the regeneration cycle.

In operation, and as can be seen from FIG. 2, disc 20 is free to rotate in a clockwise direction. This rotation is accomplished by drive disc 64 which carries a drive peg 66 arranged to engage teeth 22. In the illustrated embodiment wherein teeth 22 and holes 24 correspond to 100 gallon increments, drive disc 64 rotates 360° each time 100 gallons of water flows through meter 10. For each full revolution of drive disc 64, peg 66 engages a successive tooth 22 on a disc 20 to step the disc one tooth. Pawl 38 is free to move in a counter-clockwise direction to permit this stepping movement but is immediately returned by spring 44, to engagement of its projection 42 with a subsequent tooth on the disc to hold a step once taken.

Peg 26 will have been positioned in the hole 24 which corresponds to the gallonage at which the regeneration cycle is intended to be initiated. The rotation of disc 20 by drive disc 64 is against the bias of reset spring 36 so that as the disc is being driven through the various steps, a spring force is built up in the reset spring tending to rotate the disc in a counter-clockwise direction. When drive disc 64 moves disc 20 through the last step to the prescribed gallonage, the projection 26a of peg 26 beneath disc 20 will engage turned portion 48 on arm 46 so that during this last step arm 46 will be driven in a counter-clockwise direction with arm 46 engaging switch lever 62 to activate switch 16 and initiate the regeneration cycle. Because of the engagement between turned portion 48 and intermediate projection 40 on pawl 38, pawl 38 will also be driven in a counter-clockwise direction, thereby freeing disc 20 for movement in a counter-clockwise direction so that it may be returned to its initial setting position. Stop 37 limits the movement of the disc 20 in the resetting direction by engagement with another suitably arranged stop (not shown). The reset or counter-clockwise rotation of disc 20, is achieved by reset spring 36. It will be appreciated that spring 36 is effective to return to disc 20 to the reset position before spring 44 is capable of returning pawl 38 to its position in engagement with teeth 22. Movement of peg 26 on disc 20 is also relative to arm 46 and thus will vary the amount of movement of disc 20 which is necessary before arm 46 is engaged and moved to operate switch 62.

Accordingly, a relatively simple control arrangement is provided which achieves initiation of the regeneration cycle on the basis of flow gallonage through the water softener. The control is adjustable to select that gallonage which has been determined, with experience with the particular water source involved, to require regeneration. The control automatically resets itself at a zero setting position so that the water softener can then return to a normal cycling and will again monitor flow to initiate the regeneration cycle when necessary.

It will also be appreciated that switch 16 can be connected to a suitable timing mechanism, rather than directly to the water valve actuating mechanism, to insure that the regeneration cycle is accomplished at the next early morning hour after the flow gallonage setting has been reached so that the regeneration cycle does not occur during normal household water usage hours.

Although but one embodiment of the present invention has been illustrated and described, it will be apparent to those skilled in the art that various changes and modifications may be made therein without departing from the spirit of the invention or from the scope of the appended claims.

I claim:

1. An arrangement for initiating the regeneration cycle of a water softener and comprising, in combination,
   flow metering means having input and output means and responsive to the volume of a fluid medium flowing between said input and output means,
   flow directing means for coupling said input and output means in a series relation with a water softener and operative to direct the flow of said medium which occurs through said water softener through said metering means input and output,
   control signal generating means operative to provide a regenerating cycle initiating signal, and
   translating means connected to said metering means and operatively associated with said control signal generating means, said metering means being operative to actuate said translating means when a preselected volume of fluid medium has passed through said water softener, said translating means being operative when actuated to activate said control signal generating means.

2. The arrangement of claim 1 wherein said translating means includes means for adjusting the preselected volume at which said translating means activates said control signal generating means.

3. The arrangement of claim 1 wherein said translating means includes
   a first movable member,
   a second movable member supported for movement relative to said first movable member,
   means connecting said second movable member to said metering means for movement thereof relative to said first movable member on the basis of volume flow,
   said second movable member including means for adjusting the amount of relative movement between said first and second movable members before said second movable member engages and moves said first movable member so that the volume of flow necessary to engage said first and second movable members can be varied,
   and said control signal generating means engageable with and activated by said first movable member when said first movable member is engaged and moved by said second movable member.

4. The arrangement of claim 3 including reset means connected to said second movable member and operative when said first movable member has engaged and activated said control signal generating means to return said second movable member to its initial starting point relative to said first movable member.

5. The arrangement of claim 4 wherein said reset means includes biasing means connected to said second movable member and opposing movement thereof in response to increased flow of gallonage and biasing said second movable member in a direction toward its initial starting position.

6. The arrangement of claim 1 wherein said translating means includes
   a disc member including means defining a plurality of holes and teeth corresponding to different amounts of flow gallonage,
   a drive member connected to said metering means and selectively engaging and moving said disc member in a stepped rotation manner corresponding to a preselected gallonage figure each time said metering means measures said preselected gallonage figure,
   a pawl adjacent to said disc and selectively engageable with the teeth thereof to hold said disc in a stepped position,
   an operating arm engaging said pawl and mounted for engagement by said disc as said disc rotates in response to increase flow gallonage,
   and means on said disc adjustably positioned in a selective one of said holes and engageable with said operating arm to pivot that arm when the preselected volume gallonage has been reached,
   and switch means associated with and engageable by said operating arm when said arm is engaged and pivoted by said adjustable means on said disc, said switch means being effective to initiate said regeneration cycle when engaged by said arm.

7. The arrangement of claim 6 including
   spring means connected to said disc and opposing rotation thereof in response to increased gallonage flow,
   and said arm engaging said pawl and moving said pawl out of engagement with said disc when said arm is moved by said adjustable means on said disc to engage said switch means so that said spring means returns said disc to the initial setting thereof.

8. Apparatus for providing a control signal based on flow volume and comprising, in combination,
   flow metering means having input and output means and operative to perform a control function in response to the flow of a predetermined volume of a fluid medium between said input and output means,
   flow directing means for connecting said input and output means in series with the flow path of the medium being measured,
   control signal generating means operatively associated with said metering means, and
   translating means connected to said metering means and operatively associated with said control signal generating means and responsive to the control function of said metering means to activate the control signal generating means when a preselected volume of fluid medium has passed through said metering means.

9. The arrangement of claim 8 wherein said translating means includes means for adjusting the preselected volume at which said translating means activates said control signal generating means.

10. The arrangement of claim 8 wherein said translating means includes
    a first movable member,
    a second movable member supported for movement relative to said first movable member,
    means connecting said second movable member to said metering means for movement thereof relative to said first movable member on the basis of volume flow,
    said second movable member including means for adjusting the amount of relative movement between said first and second movable members before said second movable member engages and moves said first movable member so that the volume of flow necessary to engage said first and second movable members can be varied,
    and said control signal generating means engageable with and activated by said first movable member when said first movable member is engaged and moved by said second movable member.

11. The arrangement of claim 8 wherein said translating means includes
    a disc member including means defining a plurality of holes and teeth corresponding to different amounts of flow gallonage,
    a drive member connected to said metering means and selectively engaging and moving said disc member in a stepped rotation manner corresponding to a preselected gallonage figure each time said metering means measures said preselected gallonage figure,
    a pawl adjacent to said disc and selectively engageable with the teeth thereof to hold said disc in a stepped position,
    an operating arm engaging said pawl and mounted for engagement by said disc as said disc rotates in response to continued flow gallonage,
    and means on said disc adjustably positioned in a selective one of said holes and engageable with said operating arm to pivot that arm when the preselected volume gallonage has been reached,
    and switch means associated with and engageable by said operating arm when said arm is engaged and pivoted by said adjustable means on said disc, said switch being effective to initiate said regeneration cycle when engaged by said arm.

12. The arrangement of claim 11 including
    spring means connected to said disc and opposing rotation thereof in response to increased gallonage flow,
    and said arm engaging said pawl and moving said pawl out of engagement with said disc when said arm is moved by said adjustable means on said disc to engage said switch means so that said spring means returns said disc to the initial setting thereof.

13. An arrangement for initiating the regeneration cycle of a water softener and comprising, in combination,
    metering means having input and output means and operative to perform a control function in response to the flow of a predetermined volume of a fluid medium,
    flow directing means for coupling said input and output means in a series relation to a water softener and operative to direct the flow of said medium through both said water softener and metering means,
    control signal generating means operatively associated with said metering means,
    said metering means being operative in response to said control function to actuate said signal generating means when a preselected volume of a fluid medium has passed through said water softener, said control signal generating means being operative when actuated to generate a regeneration cycle initiating signal.

14. The arrangement of claim 13 wherein said metering means includes translating means for actuating said control signal generating means and adjusting means for adjusting the preselected volume at which said translating means activates said control signal generating means.

15. The arrangement set forth in claim 14 wherein said translating means includes an element, said metering means being operative to progressively advance said element from a first position to a second position in response to volumetric flow, said element being operative when in said second position to actuate said control signal generating means, and means for adjusting the initial position of said element.

* * * * *